United States Patent [19]

Bloom et al.

[11] Patent Number: 4,891,882

[45] Date of Patent: Jan. 9, 1990

[54] FLUID DISPENSING SYSTEM

[75] Inventors: Walter L. Bloom, Atlanta; Harry L. Vaughan, Lawrenceville, both of Ga.

[73] Assignee: Bloomland Special Products, Inc., Atlanta, Ga.

[21] Appl. No.: 93,353

[22] Filed: Sep. 4, 1987

Related U.S. Application Data

[63] Continuation-in-part of Ser. No. 832,635, Feb. 25, 1986, abandoned.

[51] Int. Cl.⁴ ............................................. A01G 3/00
[52] U.S. Cl. ..................................... 30/123.3; 47/1.01
[58] Field of Search ...................... 30/123.3, 123, 125, 30/131, 132, 134, 133; 47/1

[56] References Cited

U.S. PATENT DOCUMENTS 2,747,330  5/1956  Simpkins ............................ 30/123.3
2,870,573  1/1959  Scadden ............................. 30/123.3

Primary Examiner—Frank T. Yost
Assistant Examiner—Willmon Fridie, Jr.
Attorney, Agent, or Firm—B. J. Powell

[57] ABSTRACT

A liquid dispenser for supplying a treatment fluid to blades on a cutting implement used to cut plants which includes a distributor connected to a liquid supply unit of the treatment fluid which has a flow regulator to regulate the flow of the treatment fluid from the supply unit through the distributor and onto the cutting blades to keep the cutting blades coated with the treatment fluid.

20 Claims, 4 Drawing Sheets

FLUID DISPENSING SYSTEM

CROSS-REFERENCE TO RELATED APPLICATIONS

This application is a continuation-in-part of our copending application Ser. No. 832,635 filed Feb. 25, 1986.

BACKGROUND OF THE INVENTION

This invention relates generally to fluid distribution and more particularly to a fluid distribution system for dispensing a fluid onto the cut portions of a plant during the pruning process.

One of the problems associated with nursery operations that grow plants which need periodic pruning is that plant diseases are frequently transmitted through the pruning operation. Many times, the plant diseases are transmitted from plant to plant before it is apparent that one of the plants is diseased. Another problem encountered when cuttings are to be propagated is that the cutting needs to be scored separately from the original cut. Also, it is frequently desirable to apply growth stimulants or growth inhibitors or herbicides to plants.

Various techniques have been used in the past in an attempt to sterilize the pruning implement being used between cuts and/or apply sterilizing solutions to the pruning cut made on each plant. One technique is to simply carry a container in which the pruning implement is dunked after each cut is made. Another technique used with pneumatic pruning shears is to spray a sterilizing solution onto the pruning blades and plant after the cut is made. One of the problems with dunking the pruning implement after each cut is that it is cumbersome to use and tiring on the operator. One of the problems with the spraying device is that it is difficult to always ensure adequate coverage of both the blades and the plant being pruned since the remaining side of the cut on the plant may dramatically shift after the pruning cut is made. Also it is difficult to obtain a sufficiently uniform spray pattern to ensure complete coverage within the spray itself. Sprays from the spray device are difficult to control and may result in overspray getting onto some portions of the cutting implement and plant that might damage same. Thus, prior art has not been able to adequate solve the problem sterilizing the cutting implement.

The prior art has not been able to provide locally specific applications of a liquid to a plant. As a result, a separate scoring cut was made on the propagation stem and then dipped in the growth promoter. Locally specific applications of growth inhibiting herbicide were made with brushes. Both of these techniques are time consuming and difficult to carry out.

SUMMARY OF THE INVENTION

These and other problems and disadvantages associated with the prior art are overcome by the invention disclosed herein by providing a fluid dispensing system in which the treatment fluid is applied to the cut in the plant simultaneously with the cutting thereof by maintaining a thin coating of the treatment fluid on the blade or blades of the cutting implement. The treatment fluid is uniformly distributed along the length of the cutting edge or edges of the blades with a sufficient quantity of fluid maintained thereon to coat the side of the cut on the plant and allow the plant to adsorb the fluid through the cut. This results not only in a marked saving of the treatment fluid, but also covers only those portions of the plant which need to be treated at each cut.

The apparatus of the invention includes a distributor which distributes the treatment fluid on the blade of the cutting implement to maintain the fluid coating thereon. A solution supply assembly supplies the treatment fluid to the distributor at a controlled rate so that the desired fluid coating is maintained on the cutting blade or blades of the cutting implement. The solution supply assembly may supply a sterilizing solution to combat any cross-contamination of plants; a growth promoting solution to promote plant and/or root growth for starting plant cuttings or a growth inhibitor to inhibit growth or kill the plant being cut. The supply assembly is typically located above or on top of the cutting implement so that any treatment fluid from the supply assembly will flow under the influence of gravity through the distributor to the cutting implement. A porous plug is used to regulate the flow of the treatment fluid from the supply assembly. The supply assembly is removably connected to the distributor for easy replacement when empty while the distributor remains mounted on the cutting implement.

The method of the invention includes generating a pool of treatment fluid along the cutting blade of the cutting implement, adding treatment fluid to the pool to maintain the pool of treatment fluid, and, while the pool is maintained, cutting the stem of a plant with the cutting blade so that the cut in the plant is in communication with the pool of treatment fluid so that the plant will draw treatment fluid into the stem through the cut. This insures that the maximum effectiveness of the treatment fluid with respect to the plant will be achieved.

These and other features and advantages of the invention will become more clearly understood upon consideration of the following detailed description and accompanying drawings wherein like characters of reference designate corresponding parts throughout the several views and in which:

Figure 1:
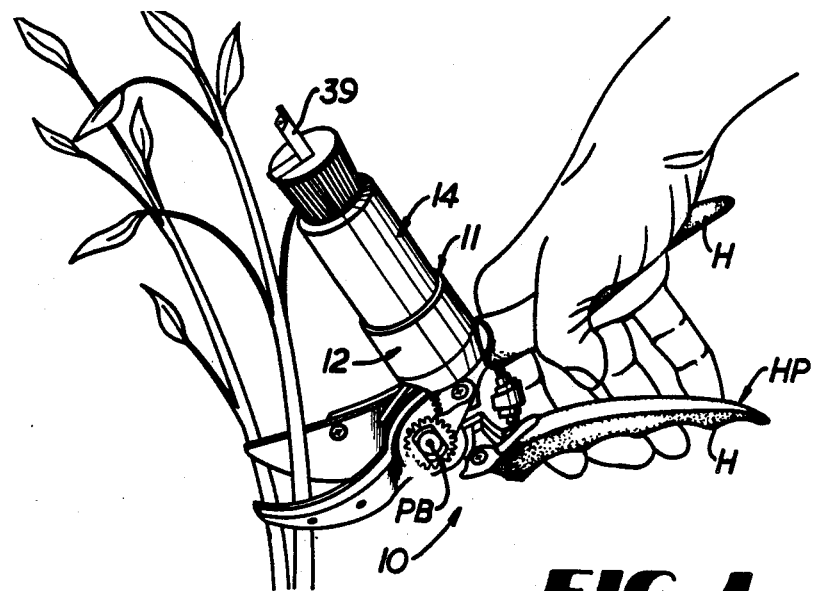
FIG. 1 is a perspective view illustrating the invention in use.
Figure 2:
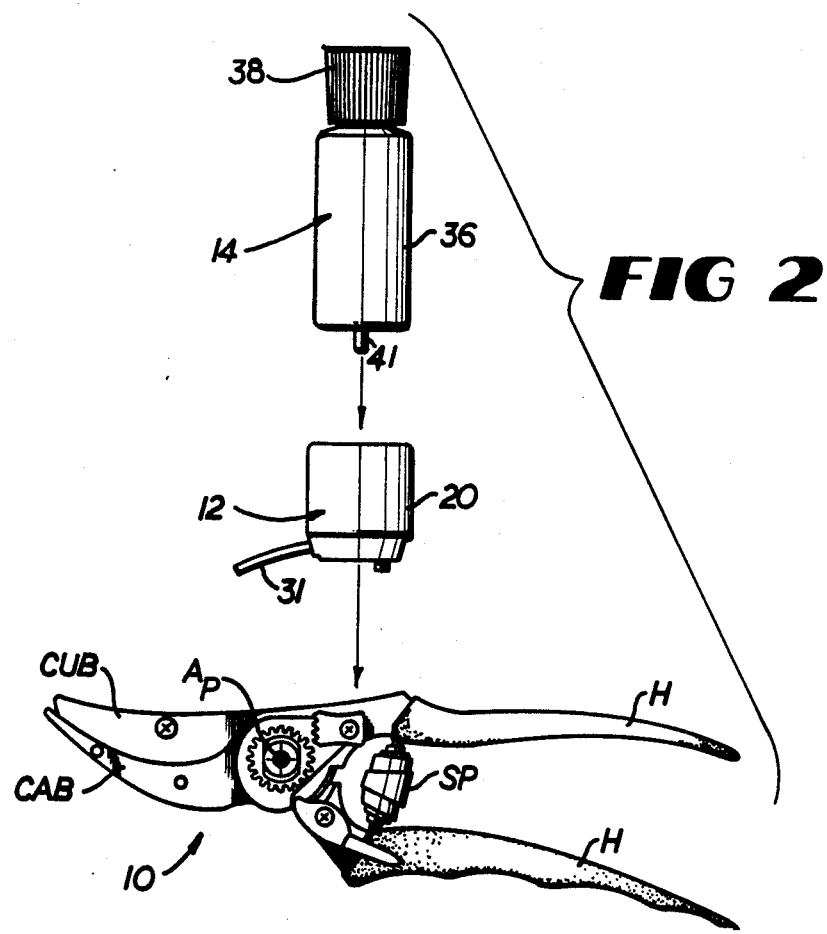
FIG. 2 is an exploded side view of the invention seen in FIG. 1.
Figure 4:
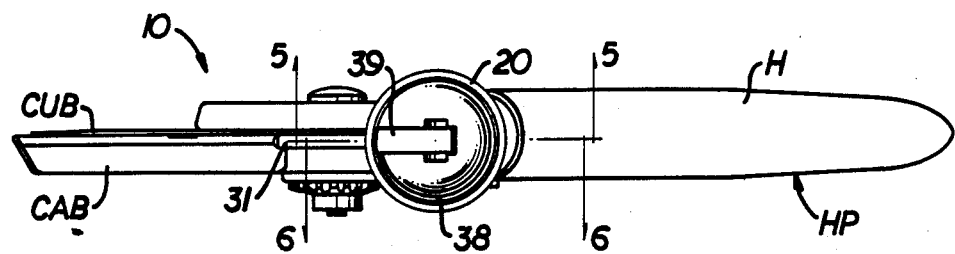
FIG. 4 is a top plan view of the invention.
Figure 3:
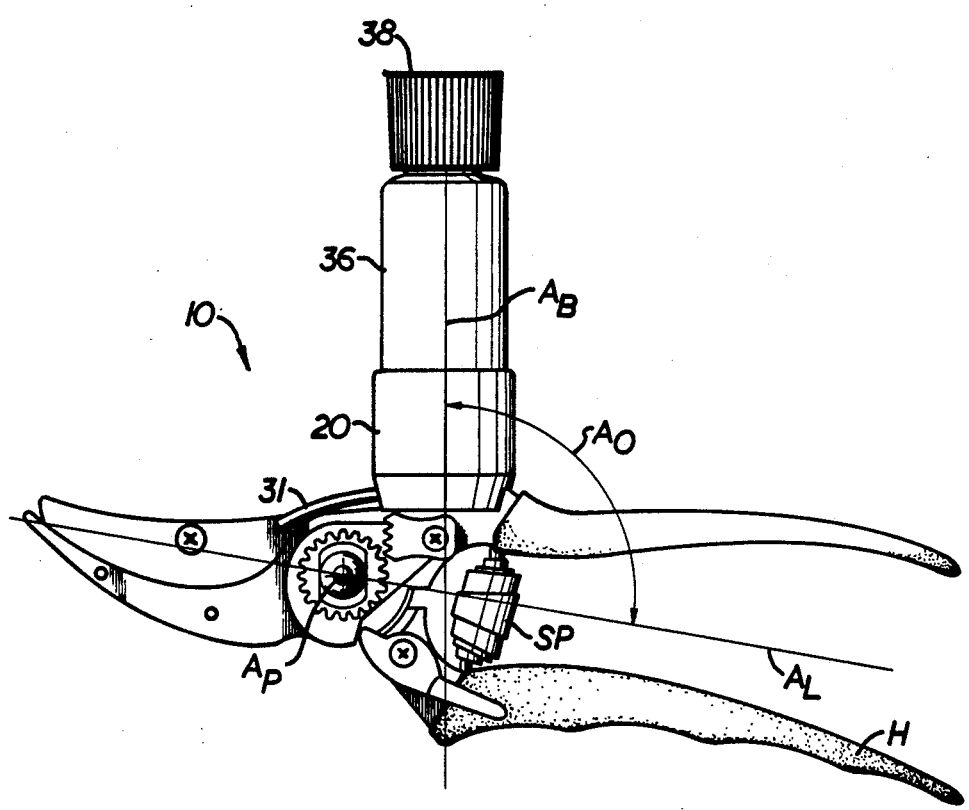
FIG. 3 is a side view of the invention assembled.
Figure 5:
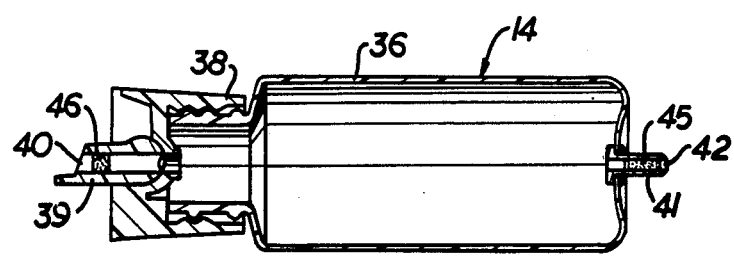
FIG. 5 is an enlarged longitudinal cross-sectional view of the supply assembly taken generally along line 5—5 in FIG. 4.
Figure 6:
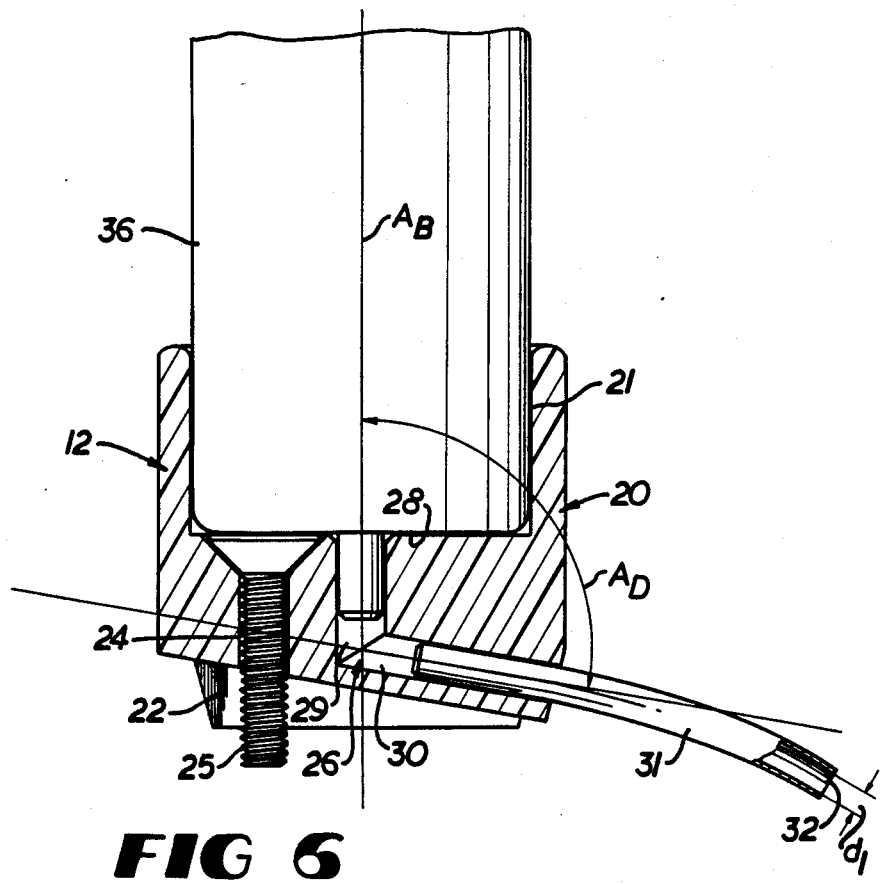
FIG. 6 is an enlarged longitudinal cross-sectional view of the distributor of the invention taken along line 6—6 in FIG. 4.

These figures and the following detailed description disclose specific embodiments of the invention; however, it is to be understood that the inventive concept is not limited thereto since it may be embodied in other forms.

DETAILED DESCRIPTION OF ILLUSTRATIVE EMBODIMENTS

The apparatus of the invention is designed for use with any cutting implement used in the pruning or cutting of plants to distribute a layer of treatment fluid onto the cutting blade or blades of the cutting implement so that the layer of treatment fluid will cover those portions of the cutting blades coming in contact with the plant. This layer of treatment fluid will likewise cover those portions of the plant being cut during the instance of cutting by the cutting implement.

Referring to the drawings, it will be seen that the first embodiment of the invention is incorporated in a self-sterilizing pruning shear assembly 10. The assembly 10 includes a hand pruner HP which mounts thereon a liquid dispensing device 11 to dispense the treatment fluid onto the pruner HP. The hand pruner HP has handles H pivoted together and adapted to be gripped in one of the user's hands and squeezed together. The pruner HP is provided with a concave anvil blade CAB and a convex cutting blade CVB mounted on the opposed handles H so that the blades CAB and CVB close on each other as they are pivoted on pivot bolt PB about their pivot axis $A_p$ when the handles H are squeezed together. The hand pruners HP are designed to be used with the blades CAB and CVB generally vertically oriented with the concave blade CAB generally below the convex blade CVB. The handles H are urged apart by spring SP.

The liquid dispensing device 11 includes a liquid distributor 12 for distributing the liquid onto the blades CAB and CVB and a liquid supply unit 14 removably inserted into the distributor 12 to supply liquid thereto. The liquid supply unit 14 can be replaced when empty or refilled in situ during use as will become more apparent.

The liquid distributor 12 includes a body 20 mounted on the upper handle H (the handle attached to the anvil blade CAB) adjacent the pivot bolt PB. The body axis $A_B$ defines an offset angle $A_O$ with respect to the longitudinal axis $A_L$ of the hand pruner HP so that the body axis $A_B$ is generally upright during a majority of normal usage. Angle $A_O$ shown is about 100°. A cylindrical bore 21 is defined in the body 20 and opens upwardly therefrom. The bore 21 is concentric about axis $A_B$ and sized to receive the liquid supply unit 14 therein as will become more apparent. A handle receiving slot 22 is defined across the bottom of the body 20 to receive handle H therein. The slot 22 is appropriately angled to locate body 20 with respect to the axis $A_L$ at angle $A_O$ and is illustrated at about 100° C. The body 20 also defines a mounting hole 24 therethrough from bore 21 to slot 22 and offset from axis $A_B$. A screw 21 extends through hole 24 and threadedly engages a like hole in handle H to hold the body 20 in place. A discharge passage 26 extends from the center of the end surface 28 of bore 21 to the outside of the body 20. Passage 26 has an inner section 29 concentric of centerline $A_B$ which joins with an outer section 30 to the outside of the body 20. The outer section 30 is aligned with slot 22 and is oriented at angle $A_D$ with respect to axis $A_B$. A convenient angle $A_D$ is about 100°.

A discharge tube 31 is fixedly mounted in the outer section 30 of passage 26 and projects outwardly therefrom. The projecting end of the tube 31 curves downwardly as will become more apparent.

The liquid supply unit 14 includes a bottle 36 equipped with a screw-on cap 38. The cap 38 is provided with a flip-up spout 39 with a central opening 40 communicating with the interior of bottle 36 when raised. The bottom of bottle 36 has a discharge tube 41 projecting therefrom and defining an opening 42 therethrough. When the bottom of bottle 36 is inserted into the bore 21 in the body 20, the tube 41 projects down into the inner section 29 of passage 26 in body 20. Thus, any liquid flowing out of bottle 36 will flow out passage 26.

To control the flow of liquid of the bottle 36, a flow regulator plug 45 is inserted in tube 41. When spout 39 is opened, the liquid will flow out of the bottle under the force of gravity with plug 45 regulating the flow rate. While various flow regulator plugs 45 may be used, porous plugs having an open cell pore structure have been found satisfactory. In particular, plastic porous plugs 45 with an open cell, omnidirectional pore structure have been found satisfactory. The particular pore characteristics and size will depend on the liquid being used. For liquids such as alcohol and the like, a plug 45 with a 90–150 micron pore size, a diameter of about 0.125 inch and a void fraction greater than about 35% has been found satisfactory. A good pore size is about 120 microns. This produces a flow rate of about 15–20 drops per minute. The flow rate is selected to insure that a coating of the treatment fluid will be maintained at the cutting edges of the blades.

A check valve may be placed in the spout opening 40 to prevent flow out of cap 38 if the assembly 10 is tipped. Alternatively a porous plug 46 may also be used to limit the liquid flow in that direction. Closing spout 39 serves to stop the liquid flow out of the discharge tube 41.

It will be understood that different flow control mechanisms may be used in lieu of the porous plug 45. For instance, a needle valve may be used. Also, the flow control mechanism may be located in the liquid distributor 12 rather than in the supply unit 14.

Figure 7:
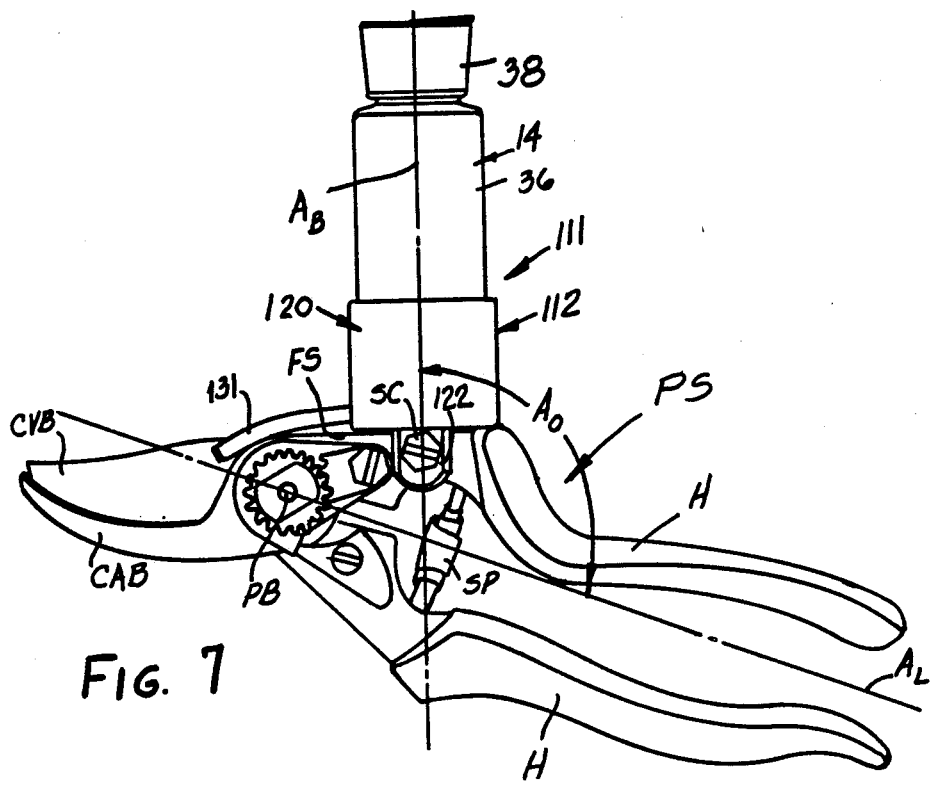
FIG. 7 is a view similar to FIG. 3 illustrating the invention embodied in an adapter.
Figure 8:
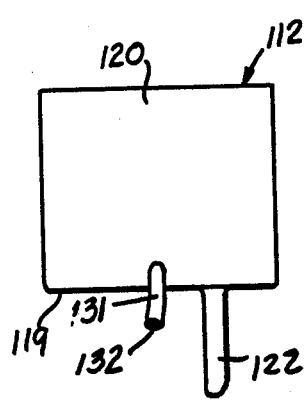
FIG. 8 is a front view of the adapter of FIG. 7.
Figure 9:
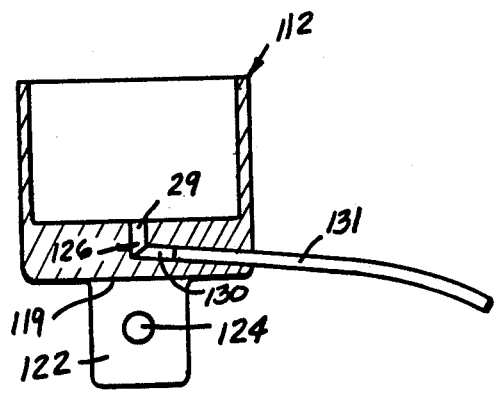
FIG. 9 is a cross-sectional view taken along line 9—9 in FIG. 8.

FIGS. 7 and 8 illustrate a second embodiment of the invention designated 111 which is adapted to be attached to existing pruning shears PS. The pruning shears PS are similar to the hand pruner HP and corresponding parts have the same reference numerals.

The liquid dispenser assembly 111 is mounted on the handle H connected to the anvil blade CAB using one of the screws SC normally connecting blade CAB to handle H. Those parts of the liquid dispenser assembly 111 which are the same as those of the device 11 have the same reference numerals applied thereto.

The liquid dispenser assembly 111 includes a liquid distributor 112 for distributing the treatment fluid onto the blades CAB and CVB and a liquid supply unit 14 connectable to the distributor 112 to supply liquid thereto similarly to that of distributor 112. The liquid distributor 112 includes a cylindrical body 120 defining a bottom support surface 119 thereon adapted to rest on the flat section FS on the upper handle H. The body axis $A_B$ defines an offset angle $A_O$ with respect to the longitudinal axis $A_L$ of the pruning shears PS so that the body axis $A_B$ is generally upright during a majority of normal usage. Angle $A_O$ shown is about 110°. A cylindrical bore 21 is defined in the body 120 and opens upwardly therefrom. The bore 21 is concentric axis $A_B$ and sized to receive the liquid supply unit 14 therein similarly to the device 11. A connector 122 is integral with the bottom of the body 120 and is offset with respect to the center of body 120 so that the connector 122 lies against the side of handle H when the support surface 119 sets on the flat section FS on the handle H with body 120 centered over handle H. The connector 122 defines a hole 124 therethrough which aligns with the screw hole in handle H for screw FS.

A discharge passage 126 extends from the center of the end surface 28 of bore 21 to the outside of the body 120. Passage 126 has an inner section 29 concentric of centerline $A_B$ which joins with an outer section 130 to the outside of the body 120. The outer section 130 is oriented at angle $A_D$ with respect to axis $A_B$. A convenient angle $A_D$ is about 95°. A discharge tube 131 is fixedly mounted in the outer section 130 of passage 126 and projects outwardly therefrom. The projecting end of the tube extends over the blade CAB, curves downwardly and also curves toward the inside surface of blade CVB so that the tip of tube 131 touches the inside surface of the blade CVB. The opening 132 in tube 131 thus rides against the inside surface of blade CVB so that the liquid discharged therefrom will coat the inside surface of blade CVB and blade CAB along the interface therebetween.

OPERATION

Both embodiments of the invention operate similarly. The treatment fluid coating is maintained along the blades CAB and CVB as the plant cut is being made. This keeps the treatment fluid in contact with the cut being made in the plant stem during the cutting operation. By keeping the treatment fluid in contact with the stem cut, the treatment fluid is surprisingly drawn into stem for a much greater distance than if the treatment fluid/cut contact is not maintained. Tests have shown this comparative distance to be at least about two times greater than when the fluid contact with the cut is not maintained during cutting.

Because of the plant liquid uptake phenomena, the method of the invention can be used to apply plant growth promoting materials as well as growth inhibitor materials to locally specific sections of the plant. This is especially important in cuttings for propagation since the growth promotion materials taken up in the cutting stem not only greatly increases the likelihood of rooting but also greatly increases the length of the stem along which root strikes appear.

Not only is it necessary to maintain the liquid pool at the cut in the plant during the cutting operation, the treatment fluid must have characteristics such that the fluid can flow up the liquid passages in the stem. Solutions that are at least thirty per cent isopropyl alcohol have worked satisfactorily. These solutions can be mixed with a growth hormone or a herbicide for application.

It may sometimes be desirable to dispense very accurate flows of the treatment fluid onto the cutting blades such as when dispensing herbicides. The operator can perform this function by closing the spout 39 on cap 38 and pressing on the side wall of the bottle 36.

We claim:

1. A treatment fluid dispenser for distributing the treatment fluid onto the cutting blade of a cutting implement for plants comprising:
    a container for holding the treatment fluid; said container defining a fluid chamber therein and a discharge passage therefrom;
    a distributor mounted on the cutting implement, said container mounted on said distributor, said distributor defining a support surface therein adapted to seat against a portion of the cutting implement adjacent the cutting blades to rotationally fix said distributor on the cutting implement and further including a connector attachable to the cutting implement to keep said distributor in place, and said distributor defining a fluid flow passage therethrough communicating with said discharge passage from said container so that the flow of treatment fluid is applied to the cutting blades to cause the treatment fluid to be applied to the cut in the plant made by the cutting blade; and
    flow control means for regulating the flow of fluid from said container out through said flow passage.

2. The dispenser of claim 1 wherein said cutting implement comprises a pair of cutter blades pivotally connected together so that said blades close over each other in a shearing action to shear plants when closed.

3. The dispenser of claim 2 wherein said container includes a cut-off valve to stop the flow of treatment fluid.

4. The dispenser of claim 2 wherein said flow control means including a porous plug.

5. The dispenser of claim 4 wherein said porous plug has a pore size of about 90–150 microns.

6. The dispenser of claim 5 wherein said porous plug has a cross-sectional area of about 0.4 sq. inch (1.0 sq. cm).

7. The dispenser of claim 6 wherein said porous plug has a void fraction of at least 35%.

8. A treatment fluid dispenser for distributing the treatment fluid onto the cutting blade of a cutting implement for plants comprising:
    a container for holding the treatment fluid; said container defining a fluid chamber therein and a discharge passage therefrom; said container further defining an external vent passage to said fluid chamber to vent said liquid chamber so that the treatment fluid can flow out said discharge passage; and further includes valve means for selectively closing said vent passage to prevent the flow of treatment fluid from said fluid chamber out through said discharge passage;
    a distributor mounted on the cutting implement, said container mounted on said distributor, said distributor defining a fluid flow passage therethrough communicating with said discharge passage from said container so that the flow of treatment fluid is applied to the cutting blades to cause the treatment fluid to be applied to the cut in the plant made by the cutting blade; and
    flow control means for regulating the flow of fluid from said container out through said flow passage, said flow control means including a porous plug located between said fluid chamber and the discharge end of said fluid flow passage in said distributor so that the flow of fluid is regulated.

9. The treatment fluid dispenser of claim 8 wherein said flow control means include a porous plug located between said fluid chamber and the discharge end of said fluid flow passage in said distributor so that the flow of fluid is regulated.

10. The dispenser of claim 8 wherein said container further includes flow restriction means in said vent passage to limit the flow rate of fluid therethrough in the event that said container is inverted while said valve means is open.

11. The dispenser of claim 10 wherein said distributor includes a discharge tube through which said fluid flow passage extends and having a discharge opening therefrom located in the vicinity of the cutting blade so that the sterilizing liquid passing therefrom coats the cutting blade along the cutting edge thereon.

12. The dispenser of claim 11 wherein said distributor defines a cylindrical inner section on said discharge passage and wherein said container includes a projection thereon defining said discharge passage therethrough adapted to fit in said inner section of said discharge passage in said distributor.

13. The dispenser of claim 10 further including interconnection means for, releasably connecting said container and said distributor.

14. The dispenser of claim 10 wherein said container defines an engagement section thereon adjacent said discharge passage having a prescribed cross-section size and shape and wherein said distributor defines an outwardly opening bore therein about said fluid flow passage having a cross-sectional size and shape complementary to said engagement section on said container so that said distributor frictionally engages said container to hold said engagement section in said bore.

15. The dispenser of claim 10 wherein said distributor includes a discharge tube through which said fluid flow passage extends and having a discharge opening therefrom located in the vicinity of the cutting blades so that the treatment fluid passing therefrom coats the cutting blade along the cutting edge thereon.

16. The dispenser of claim 15 wherein said distributor defines a cylindrical inner section on said discharge passage and wherein said container includes a projection thereon defining said discharge passage therethrough adapted to fit in said inner section of said discharge passage in said distributor.

17. The dispenser of claim 16 wherein said container defines an engagement section thereon adjacent said discharge passage having a prescribed cross-sectional size and shape and wherein said distributor defines an outwardly opening bore therein about said fluid flow passage having a cross-sectional size and shape complementary to said engagement section on said container so that said distributor frictionally engages said container to hold said engagement section in said bore.

18. A treatment fluid dispenser for distributing the treatment fluid onto the cutting blade of a cutting implement for plants comprising:
a container for holding the treatment fluid; said container defining a fluid chamber therein and a discharge passage therefrom;
a distributor mounted on the cutting implement, said container mounted on said distributor, said distributor defining a slot therein adapted to fit over a portion of the cutting implement adjacent the cutting blades to rotationally fix said distributor on the cutting implement and further including attachment means for attaching said distributor to the cutting implement, said distributor defining a fluid flow passage therethrough communicating with said discharge passage from said container so that the flow of treatment fluid is applied to the cutting blades to cause the treatment fluid to be applied to the cut in the plant made by the cutting blade; and
flow control means for regulating the flow of fluid from said container out through said flow passage.

19. A dispenser for a treatment fluid comprising:
a container defining a closed fluid chamber therein having opposed ends;
a fluid outlet in one end of said container defining a discharge fluid passage therethrough communicating with said chamber;
a porous plug in said discharge fluid passage to regulate the flow of the treatment fluid from said closed chamber; and
venting means associated with that end of said container opposite said fluid outlet to vent said closed chamber to the atmosphere.

20. A dispenser for a treatment fluid comprising:
a container defining a closed fluid chamber therein having opposed ends;
a fluid outlet in one end of said container defining a discharge fluid passage therethrough communicating with said chamber; and
a porous plug in said discharge fluid passage to regulate the flow of the treatment fluid from said closed chamber,
said container further including a flexible side wall so that fluid can be forced from said container by pressing in on said wall.

* * * * *